US008239517B1

(12) United States Patent
Jachner et al.

(10) Patent No.: US 8,239,517 B1
(45) Date of Patent: Aug. 7, 2012

(54) ARCHITECTURE FOR PRESENCE BASED TRANSACTION TRACKING ACROSS MULTIPLE DEVICES AND CLIENTS

(75) Inventors: Jack Jachner, Plano, TX (US); Kirit Mehta, Richardson, TX (US); Timucin Ozugur, Garland, TX (US); Aziz Mohammed, Plano, TX (US)

(73) Assignee: Alcatel Lucent, Paris (FR)

( * ) Notice: Subject to any disclaimer, the term of this patent is extended or adjusted under 35 U.S.C. 154(b) by 1093 days.

(21) Appl. No.: 10/738,619

(22) Filed: Dec. 17, 2003

(51) Int. Cl.
*G06F 15/173* (2006.01)
(52) U.S. Cl. ........................................................ 709/224
(58) Field of Classification Search ................. 709/224
See application file for complete search history.

(56) References Cited

U.S. PATENT DOCUMENTS

| | | | | |
|---|---|---|---|---|
| 6,463,420 | B1 * | 10/2002 | Guidice et al. | 705/28 |
| 2002/0035605 | A1 * | 3/2002 | McDowell et al. | 709/206 |
| 2002/0103917 | A1 * | 8/2002 | Kay et al. | 709/229 |
| 2003/0048195 | A1 * | 3/2003 | Trossen | 340/825.49 |
| 2004/0030601 | A1 * | 2/2004 | Pond et al. | 705/16 |

OTHER PUBLICATIONS

Rosenberg, Jonathan, Lennox, Jonathan, Schulzrinne, Henning, "Programming Internet Telephony Services", IEEE Network, May / Jun. 1999.*
Vaughan-Nichols, Steven, "Presence Technology: More than Just Instant Messaging", IEEE Computer, Oct. 2003—General discussion of Presence Technology.*
MSN Messenger Service, description at http://messenger.msn.com/ in , (last visited on or about Mar. 13, 2003). Owner Microsoft Corporation, One Microsoft Way, Redmond, Washington 98052-6399, Redmond Washington, Unknown patent/trademark date (see Attachment No. 1).
Microsoft.NET alerts, description at http://www.microsoft.com/net/ services/alerts (last visited on Mar. 13, 2003). Owner Microsoft Corporation, One Microsoft Way, Redmond, Washington 98052-6399, Redmond Washington, Unknown patent/trademark date. (see Attachment No. 2).

* cited by examiner

*Primary Examiner* — William Goodchild
(74) *Attorney, Agent, or Firm* — Garlick & Markison; Holly L. Rudnick

(57) ABSTRACT

A presence-based transaction tracking method and system for communicating transaction information over a data network in which a sensing device in a host network associated with a transaction publishes presence information associated with a sensed transaction state to a server. A watcher subscribes to the server for receiving the presence information in which a middleware application can enable a watcher access across disparate client messaging systems.

20 Claims, 2 Drawing Sheets

ARCHITECTURE FOR PRESENCE BASED TRANSACTION TRACKING ACROSS MULTIPLE DEVICES AND CLIENTS

FIELD OF THE INVENTION

The invention relates generally to presence transactions and, more particularly, to presence-based transaction tracking systems.

BACKGROUND OF THE INVENTION

Currently, transaction services are commonly tracked by surfing to the service provider's web site and polling the status information or using other non-real-time alternatives. Solutions based on alert mechanism (such as the Microsoft alert protocol) are also emerging. This type of proprietary alert technique/protocol is limited in that tracked transactions are only shown within systems under a common host. Limitations occur when the desired objective is transaction tracking across disparate client messaging systems. For example, Microsoft has an alert service that provides transaction tracking services via alerts sent to Microsoft messenger subscribers, however, the Microsoft alert system and associated protocols are designed to only work with Microsoft messengers.

Recently, the Session Initiation Protocol or SIP (which is a simple signaling/application layer open protocol) has been developed for creating, modifying, and terminating sessions with one or more clients within a data network telephony for facilitating media-independent signaling. With SIP, end systems and proxy servers can provide services such as personal mobility/location-independent addressing, call forwarding, terminal-type selection, call transfer, and conference calling, via the SIP protocol for providing such service over the Internet or other IP networks. The following documents are incorporated herein by reference: Rosenberg, J., etc., SIP: Session Initiation Protocol, RFC 3261; Rosenberg, J. "A Watcher Information Event Template-Package for SIP", draft-ietf-simple-winfo-package-05.txt. Internet Draft, January 2003, Work in progress; Rosenberg, J., "An XML Based Format for Watcher Information", draft-ietf-impp-cpim-pidf-05.txt. Internet Draft, January 2003, Work in Progress; Roach, A., "SIP-Specific Event Notification", RFC 3265, Internet Engineering Task Force, June 2002; and Kiss, K. et al., "Requirements for Filtering of Watcher Information", draft-kiss-simple-winfo-filter-reqs-00.txt. Internet Draft, February 2003, Work in progress.

"Presence" refers to, for example, the availability, proximity, activity level or operating state of a user on a network. The ability for users to monitor each other's presence is a feature offered in connection with many applications. For example, instant messaging applications such as MSN or Yahoo have an "available buddy" feature, in which a user of a respective application can determine whether select users (also within the respective application) are available for engaging in communication. The data retrieved and returned to a user is known as "presence information," and is generally maintained by a presence server in the data network, often a dedicated server.

Referring now to FIG. 1 there is shown a conventional presence architecture in which a presence server 12 provided in a data network provides to the user of a first communication device 13 information indicative of the presence state of a second communication device 11. Typically, the presence server 12 supports network telephony protocols such as the session initiation protocol (SIP). Users can register their communication devices with the presence server 12 in order to have their presence maintained and to allow various programs on the network to facilitate network telephony services. The first device user 13 wishing to detect the presence of the second device user 11 (also known as a presence user agent (PUA) or presentity) does so by "subscribing" 14 with the presence server 12, such as via a SIP SUBSCRIBE message. The presence server 12 intermediates between the first device user 13 (also known as the watcher or subscriber), and the second device user 11 to facilitate the communication of the second device user's presence information to the first device user. More specifically, the presence server 12 updates the presence information to the watcher 13 in an appropriate NOTIFY message every time there is a change in the state of the presence information This real-time approach can significantly enhance communication and task completion over the network. For example, a very mobile user may only be on the network at certain times throughout the day, and may be accessing the network from varying locations. By subscribing as a watcher of this mobile user, it becomes possible for another user to detect the presence of the mobile user during the times at which the mobile user's device is actually connected to the network. So, when the mobile user is present, the watcher can correspond instantly with the mobile user, for example via a chat session or videoconferencing call, as opposed to resorting to a non-real-time communication such as e-mail messaging. Hence, presence is proving to be an important factor for facilitating communication between users.

The work being done in the Internet Engineering Task Force or IETF on open presence systems generally address only the basic frameworks of a presence service. Existing practice is deficient of systems and techniques important to extending presence to meeting other needs, such as transaction tracking and interoperability for transaction tracking service across multiple devices and/or client systems.

SUMMARY

The present invention achieves technical advantages as a presence-based transaction tracking system in which a middleware application can enable watcher access across disparate client messaging systems.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which.

DETAILED DESCRIPTION

Figure 1:
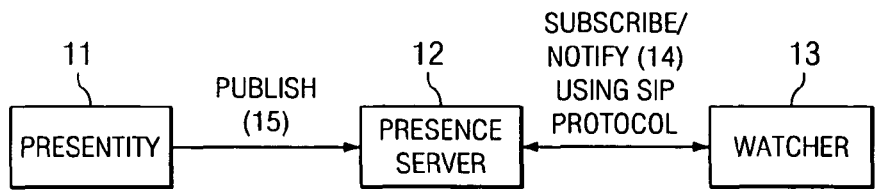
FIG. 1 shows a block diagram illustrating an open system architecture for providing user presence information to a watcher.

In accordance with embodiments of the present invention, a presence-based system is provided for tracking an item and/or transaction. The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function.

Figure 2:
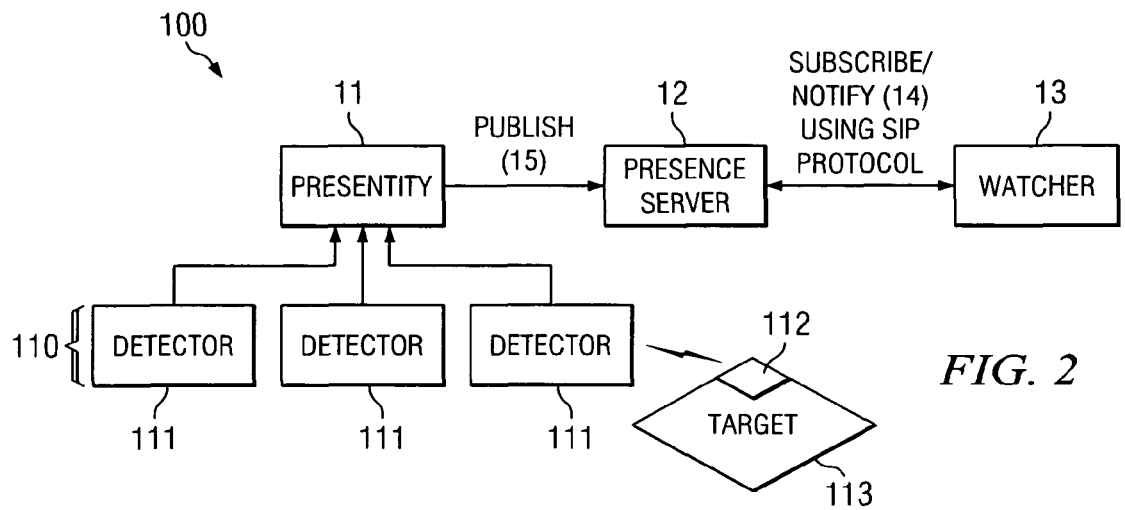
FIG. 2 diagrammatically illustrates a transaction tracking architecture using an extension of the presence architecture illustrated in FIG. 1 in accordance with exemplary embodiments of the present invention.

Referring now to FIG. 2 there is diagrammatically illustrated a presence-based transaction tracking architecture 100 wherein a watcher 13 receives presence information about a desired transaction state. The architecture 100 is an extension 110 of the presence architecture illustrated in FIG. 1. Whereas the system of FIG. 1 enables a first user to detect a second user's presence on a network, the architecture 100 enables a first user to track an item through a transaction cycle. The extension 110 portion includes a plurality of detector devices 111 coupled with the presentity 11 for detecting/determining the target's state which can be effected by collecting information from communication devices 111 associated with the target 113 or which can read a unique identifier 112 associated with the target 113. There is located at least one device 111 at each recognized transaction state. The unique identifier 112 can be, for example, an electronic tag, bar code, or other suitable ID device.

With transaction detection reporting from one of the devices 111, the presentity 11 issues in a PUBLISH 15 message the detection along with any of the detector's identification which is need for determining the target transaction state. The PUBLISH message is received by a presence server 12 in which is provided a message format for SUBSCRIBE messages for permitting a watcher 13 to select a unique identifier for watching. In operation, for example, a client can be shipping an important package through a major package handler company. While filling out the form to send his package, the client requests to be a watcher to track the status of his package. For this, he will be asked to include sender/receiver username on the network. Further, a unique ID tag corresponding to the client is coupled with the package. More specifically, the package company enters the package (identified by the ID tag) and the client in a "buddy" list arrangement. As the package proceeds through shipping (i.e., a transaction cycle), the status is notified to the client in real-time, thus, the client will know if his package is on schedule, delayed and/or delivered. Once the shipping is complete, the package "buddy" is removed from the client's list. In another transactional scenario, the client sender/receiver information may be obtained by other means such as directory assistance or e-mail/voice interaction between the client and the package company.

In addition, each of the package and client can be included in a "buddy" list with the package company. This will give the client an added option of clicking on his company "buddy" to converse with a company agent through the use of instant messaging and/or instant voice concerning his package. The "buddy" list can be dissolved once the transaction is completed. Alternatively, the client and the company might agree to keep the "buddy" list intact for future use.

Figure 3:
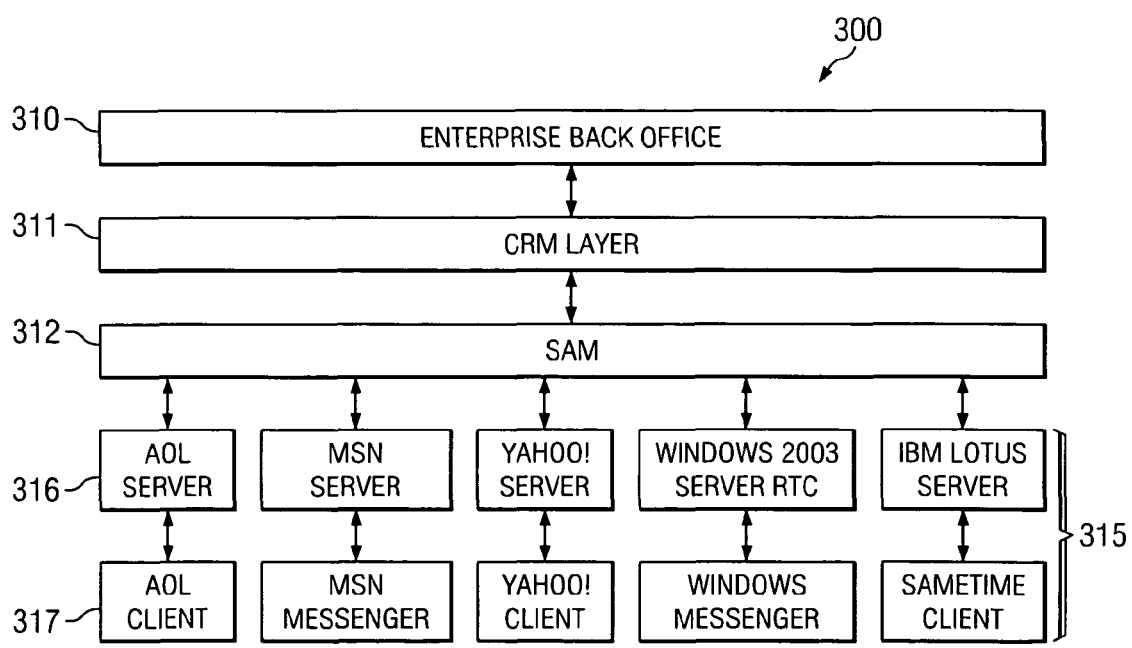
FIG. 3 diagrammatically illustrates a further transaction tracking architecture in accordance with exemplary embodiments of the present invention.

As noted previously, conventional "buddy" systems (such as Yahoo and MSN) are not interoperable. That is, buddies from one system can not commingle with buddies on another system. Referring now to FIG. 3 there is diagrammatically illustrated a presence based transaction tracking system 300 for tracking an item and/or transaction which is operable between normally non-interoperable client systems in accordance with embodiments of the present invention. The proposed architecture can, for example, extend services over any type of client software, such as AOL, Yahoo!, and AIM, as well as others. The system 300 includes the Enterprise or back office 310, the Customer Relation Management layer, and a Service Access Middleware (SAM) which act as a translator between non-interoperable systems. A client system 315 includes the particular client server 316 (such as the AOL server) and the client communication device 317 for that particular system. The communication device 317 can be telephone device, a handheld computer device, a laptop computer device and a desktop computer device.

The back office 310 includes the above-described presentity 11 with extension 110 and the presence server 12 (as above-described and shown in FIG. 2) in which the SAM enables a user watcher 13 from any determined client system. The SAM is a middleware concept that unifies presence across multiple client systems. That is, the back office 310 can perform transaction tracking of a package and create a "buddy" list to include the package and/or detector 11 and a user which may be using any one of the determined client systems. So, for example, a back office 310 utilizing an proprietary IBM messaging system can create a "buddy" list including a user in an AOL messaging system and the package/detector in the IBM system.

Detailed descriptions of known functions and constructions unnecessarily obscuring the SAM layer of the present invention have been omitted for clarity. Those skilled in the art will be able to construct an operational SAM layer when presented with those elements and functionality disclosed herein. Further, the SAM layer can be realized in computer readable memory comprising instructions for performing those elements and/or functionality disclosed herein. The SAM 312 interfaces with the back office 310 for managing all the necessary activities to include the target 113 in a temporary "buddy" list with the client watcher 317. Update information is passed from the back office presence server to the client watcher 317 through the SAM 312. A "buddy" list for client initiated focused communication between the client and a service provider can be provided for the duration of the transactions. The balanced distribution of "buddy" list members to agents in the back office 310 is also managed by SAM 312. This unique handling of temporary "buddy" list enables a system such that a watcher can easily ask for customer help throughout the transaction time. In conventional systems, the client must go through a separate customer service system for help.

The SAM 312 is configured for communication with a predetermined client system on a customer-by-customer basis from client supplied information, such as username/receiver, messaging system type, protocol, etc. For example, the back office 310 can communicate with the client via conventional e-mail to learn the preferred communication option where it is unknown which client system (i.e., Yahoo Messenger with buddy list, AOL Messenger with buddy list and MSN Messenger with buddy list) is being utilized. The SAM 312 may also include a bridging function pre-configured for communications with the most common clients (further discussed below).

The SAM 312 can also include a conventional Customer Relation Management (CRM) application layer 311. Generally, CRM is known as those applications for business and management processes (such as accounting) related to customer and supplier relationship integration. The CRM layer 311 is an application or software integration of the CRM applications, associated communication channels, and other routing engines. Many companies supply such management application products.

Figure 4:
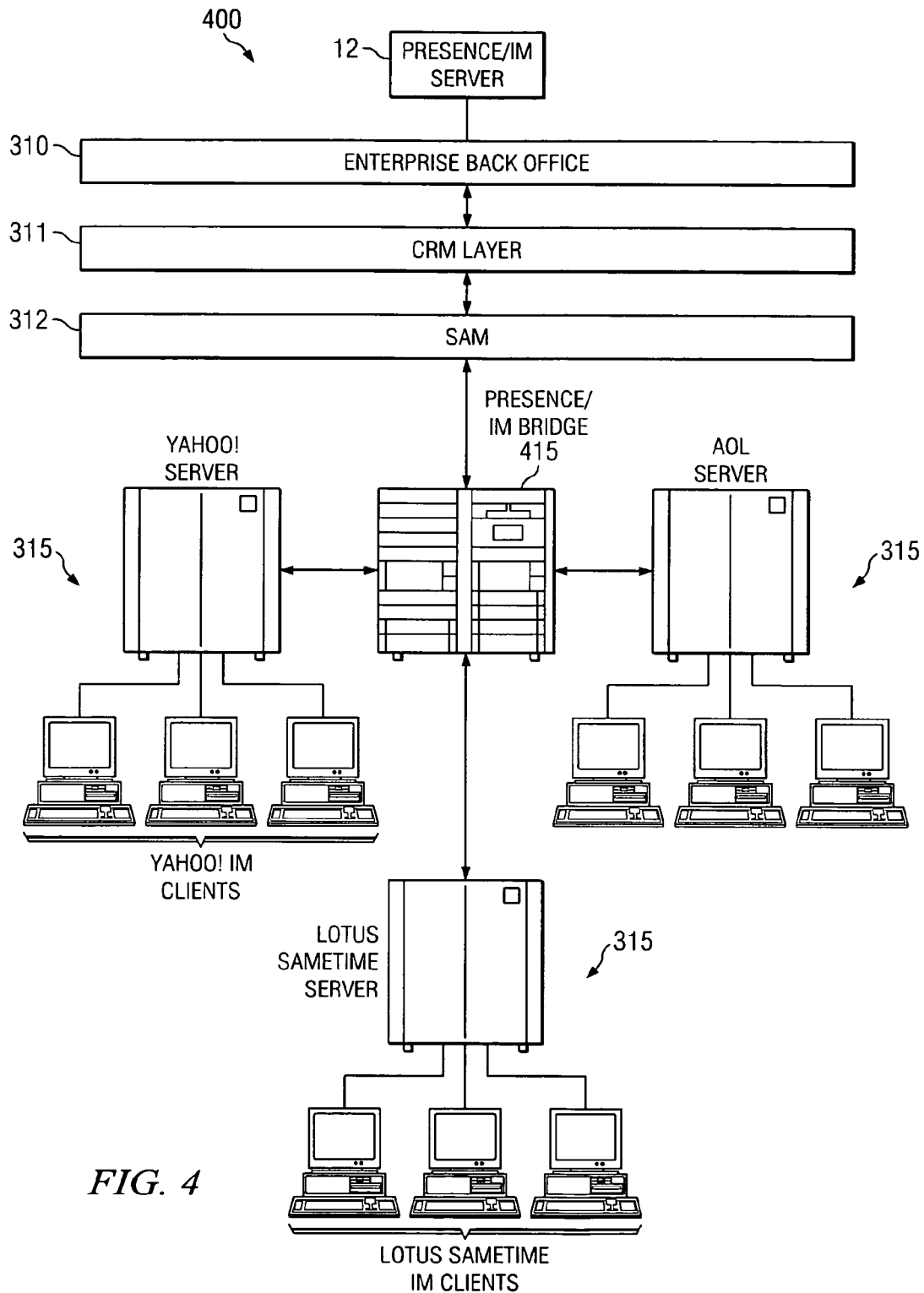
FIG. 4 diagrammatically illustrates a still further transaction tracking architecture in accordance with exemplary embodiments of the present invention.

Referring now to FIG. 4 there is diagrammatically illustrated a further presence-based transaction tracking system 400 for tracking an item and/or transaction which is operable between normally non-interoperable client systems via a bridge 415. The bridge 415 functions as a client system identifying/translation device which can be included in the SAM 312 or can be a dedicated server. The bridge 415 is pre-configured from information of common public messenger client systems 315 and is coupled in communication therewith between the back office 310. In operation, the bridge 415 can identify the client system 315 from the protocol associated with a watcher request communication. The bridge/SAM uses this information to operate as a translator between the identified client system 315 and the back office 310 to enable the above-described presence-based transaction tracking.

Although exemplary embodiments of the present invention have been described in detail, it will be understood by those skilled in the art that various modifications can be made therein without departing from the spirit and scope of the invention as set forth in the appended claims.

What is claimed is:

1. A method for communicating transaction information associated with a transaction to a communication device, comprising:
   sensing a real-time state of said transaction, said transaction being carried out between separate entities that involves the exchange of a physical item of value;
   publishing presence information containing said sensed real-time state of said transaction to a presence server that maintains additional presence information regarding the availability of users;
   subscribing, by said communication device, to said presence server as a watcher of said transaction to receive said presence information, said communication device being associated with a user involved in said transaction; and
   providing said presence information containing said sensed real-time state of said transaction from said presence server to said communication device.

2. The method of claim 1 further including publishing said presence information by means of a first messaging system using a first protocol; and
   translating said presence information received at said server to a protocol recognizable to other messaging systems which are conventionally incompatible with said first messaging system.

3. The method of claim 2 further including subscribing to said server from a messaging system which is conventionally incompatible with said first messaging system.

4. The method of claim 3 determining from which messaging system a subscription is received for selecting a translation protocol.

5. The method of claim 1 further including publishing said presence information by means of a first messaging system using a first protocol; and
   translating said presence information realized by said first protocol to a second protocol used by said communication device in a second messaging system.

6. The method of claim 5, wherein said communication device is one of a telephone device, a handheld computer device, a laptop computer device and a desktop computer device.

7. The method of claim 5, wherein said communication device is incapable of receiving said presence information realized in said first protocol.

8. The method of claim 1 further including publishing said presence information by means of a first messaging system using a first protocol, wherein a received subscription is receivable from a messaging system other than said first messaging system; and
   providing information of a second protocol necessary for translating said presence information realized by said first protocol.

9. The method of claim 8 determining from which other messaging system a subscription is received from information contained in an associated subscription.

10. The method of claim 1 further including sensing at least one state of a sequence of states associated with said transaction.

11. The method of claim 1, wherein said publishing step includes publishing said presence information via SIP messaging.

12. A system for communicating transaction information over a data network, comprising:
   a sensing device in a host network associated with a transaction carried out between separate entities that involves the exchange of a physical item of value for sensing a real-time transaction state of said transaction and having an output for publishing presence information containing said sensed real-time transaction state;
   a presence server in said host network and having an input for receiving said published presence information, said presence server further maintaining additional presence information regarding the availability of users; and
   a communication device in communication with said server and having an output for providing a subscription message to said presence server to subscribe as a watcher of said transaction to receive said presence information and an input for receiving said requested presence information containing said sensed real-time transaction state, said communication device being associated with a user involved in said transaction.

13. The system of claim 12, wherein said communication device is in a guest network, and wherein said host network communicates presence information by means of a first messaging protocol and said guest network communicates presence information by means of a second messaging protocol.

14. The system of claim 13 further including an application layer in communication between said server and said communication device for translating communication therebetween.

15. The system of claim 14, wherein said application layer received a subscribe message from said communication device by means of said second messaging protocol and translates to said first messaging protocol for forwarding to said server, said application layer further receiving said presence information from said server by means of said first messaging protocol and translates to said second messaging protocol for forwarding to said communication device.

16. The system of claim 14, wherein said application layer is realized in computer readable memory having instruction for performing said translating functionality.

17. The system of claim 13, wherein said first and second messaging protocols each include one of MSN messenger, AOL, Yahoo.

18. The system of claim 12, wherein said publishing is via SIP messaging and said subscription message is via SIP messaging.

19. A system for providing transaction tracking services to clients over a plurality of disparate client messenger systems, comprising:
- a presence-based host network for receiving presence information containing a sensed real-time state of a transaction carried out between separate entities that involves the exchange of a physical item of value and for maintaining additional presence information regarding the availability of users, said presence-based host network communicating said presence information by means of a first messaging protocol; and
- a service access middleware interface for interfacing between said presence-based host network and a plurality of messaging systems, each communicating by means of further messaging protocols, to provide said presence information containing said sensed real-time state of said transaction to said plurality messaging systems in a respective appropriate format for transmission to a client associated with one of said plurality of messaging systems, said client subscribing to said presence-based host network via said service access middleware interface as a watcher of said transaction to receive said presence information, said client being associated with a user involved in said transaction.

20. The system of claim 19, wherein said further messaging protocols include one of MSN messenger, AOL, Yahoo.

* * * * *